United States Patent [19]

Cameron

[11] Patent Number: 5,221,881
[45] Date of Patent: Jun. 22, 1993

[54] METHOD AND APPARATUS FOR OPERATING POLYPHASE DC MOTORS

[75] Inventor: Scott W. Cameron, Phoenix, Ariz.

[73] Assignee: SGS-Thomson Microelectronics, Inc., Carrollton, Tex.

[21] Appl. No.: 770,576

[22] Filed: Oct. 3, 1991

[51] Int. Cl.$^5$ .......................................... H02K 23/00
[52] U.S. Cl. .................................. 318/254; 318/138; 318/439
[58] Field of Search ............... 318/254, 139, 438, 138; 388/911, 928.1

[56] References Cited

U.S. PATENT DOCUMENTS

| | | | |
|---|---|---|---|
| Re. 31,229 | 5/1983 | King | 318/254 X |
| 4,027,215 | 5/1977 | Knight et al. | 318/254 |
| 4,238,717 | 12/1980 | Knight et al. | 318/254 |
| 4,390,826 | 6/1983 | Erdman et al. | 318/439 |
| 4,492,903 | 1/1985 | Knight et al. | 318/254 X |
| 4,513,230 | 4/1985 | Erdman et al. | 318/254 |
| 4,556,827 | 12/1985 | Erdman et al. | 318/254 |
| 4,743,815 | 5/1988 | Gee et al. | 318/254 |

Primary Examiner—William M. Shoop, Jr.
Assistant Examiner—David S. Martin
Attorney, Agent, or Firm—Richard A. Bachand; Lisa K. Jorgenson; Richard K. Robinson

[57] ABSTRACT

A circuit for operating a polyphase dc motor, for example of the type having a plurality of "Y" connected stator coils, has circuitry for unambiguously determining the actual instantaneous position of the rotor of the motor, circuitry for determining a desired rotor position precedent to executing a desired commutation sequence, and circuitry for executing the desired commutation sequence when the circuit for determining the actual instantaneous position of the rotor detects that the rotor is actually in the desired rotor position. The circuitry for unambiguously determining the actual instantaneous position of the rotor includes a back emf amplifier switchably connected to at least one floating coil in accordance with sequence signals received directly from a sequence generator, and circuitry for determining when the voltage received by the back emf amplifier crosses zero from a predetermined direction. In one embodiment, the circuit includes mask circuitry for inhibiting the zero crossing detection circuitry for a predetermined time after a change in the commutation sequence. The mask circuitry includes clocked up and first and second down counters, the second down counter being inhibited to be clocked until the first down counter has reached a predetermined count, and the zero crossing circuitry being inhibited until at least the second down counter has completed its count. When a zero crossing is detected, the count of the up counter is loaded into both the first and second down counter, then the up counter is reset to begin a new commutation period count.

15 Claims, 6 Drawing Sheets

METHOD AND APPARATUS FOR OPERATING POLYPHASE DC MOTORS

BACKGROUND OF THE INVENTION

1. Field of the Invention

This invention relates to improvements in circuitry for driving polyphase motors, and more particularly to improvements in circuitry for driving polyphase dc motors, and still more particularly to methods and apparatus for controlling a spinning rotor of a polyphase dc motor using the zero voltage crossing information of non-selected rotor coils.

2. Description of the Prior Art

Although the present invention pertains to polyphase dc motors, in general, it finds particular application in conjunction with three phase dc motors, particularly of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils connected in a "Y" configuration, although actually, a larger number of stator coils are usually employed with multiple motor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90°. In operation, the coils are energized in sequences in each of which a current path is established through two coils of the "Y", with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. In this manner, six commutation sequences are defined for each electrical cycle in a three phase motor.

In the past, during the operation of a such polyphase dc motor, it has been recognized that maintaining a known position of the rotor is an important concern. There have been various ways by which this was implemented. The most widely used way, for example, was to start the motor in a known position, then develop information related to the instantaneous or current position of the rotor. One source of such instantaneous position information was developed as a part of the commutation process, and involved identifying the floating coil, and monitoring its back emf, that is, the emf induced into the coil as it moves through the magnetic field provided by the stator.

When the voltage of the floating coil crossed zero (referred to in the art as "a zero crossing"), the position of the rotor was assumed to be known. Upon the occurrence of this event, the rotor coil commutation sequence was incremented to the next phase, and the process repeated. The assumption that the zero crossing accurately indicated the rotor position was generally if the motor was functioning properly, and nothing had occurred which would disturb its synchronization from its known startup position. However, events did occur which often resulted in a loss of synchronization. Such loss of synchronization might occur, for example, if the rotation of the disk was interrupted by a physical bump, or by a stick motor bearing, or by frictional losses in the disk carrier, and so on. And, once such loss of synchronization occurred, there was no recovery.

The possibility of loss of synchronization made the motors previously used vulnerable and delicate, and great care had to be taken to insure that the startup algorithms and running conditions were precisely controlled to avoid anything which might cause such out of synchronization condition to occur.

SUMMARY OF THE INVENTION

In light of the above, therefore, it is an object of the invention to provide an improved apparatus and method for driving a polyphase dc motor in response to an unambiguous instantaneous position indication of the rotor of the motor.

It is another object of the invention to provide an improved apparatus and method of the type described which is useful for driving three phase dc motors, particularly of the brushless, sensorless type which are used for rotating data media, such as found in computer related applications, including hard disk drives, CD ROM drives, floppy disks, and the like.

It is still another object of the invention to provide an improved apparatus and method which uses the zero crossing of the voltage of the floating coils, in conjunction with information indicating the direction of the crossing to remove any ambiguity in the detection of the position of the rotor.

It is still another object of the invention to provide an improved apparatus and method which enables recovery from a condition in which the rotor position has become out of synchronization with the sequencer of the rotor commutation circuit.

It is yet another object of the invention to provide an improved apparatus and method which provides means for preventing commutation and switching noise from creating false zero crossing in the detection of the position of the rotor.

These and other objects, features and advantages of the invention will be apparent to those skilled in the art from the following detailed description of the invention, when read in conjunction with the accompanying drawings and appended claims.

In its broad aspect, the invention presents a circuit for operating a polyphase dc motor of the type having a plurality of "Y" connected stator coils has circuitry for unambiguously determining the actual instantaneous position of the rotor of the motor, circuitry for determining a desired rotor position from output signals derived directly from the output of a sequence generator precedent to executing a desired commutation sequence, and circuitry for executing the desired commutation sequence when the circuit for determining the actual instantaneous position of the rotor detects that the rotor is actually in the desired rotor position. The circuitry for unambiguously determining the actual instantaneous position of the rotor includes a back emf amplifier switchably connected to at least one floating coil, and circuitry for determining when the voltage received by the back emf amplifier crosses zero from a predetermined direction. In one embodiment, the circuit includes mask circuitry for inhibiting the zero crossing circuitry for a predetermined time after a change of commutation sequence. The mask circuitry includes clocked up and first and second down counters, the second down counter being inhibited to be clocked until the first down counter has reached a predetermined count, and the zero crossing circuitry being inhibited until at least the second down counter has completed its count. When a zero crossing is detected, the count of the up counter is loaded into both the first and second down counters, then the up counter is reset to begin a new commutation period count.

In another broad aspect of the invention, a method for operating a polyphase dc motor having a plurality of driving coils is presented including the steps of unambiguously determining the actual instantaneous position of the rotor of the motor, determining a desired rotor position directly from signals at an output of a commutation sequence generator precedent to executing a desired commutation sequence, and executing the desired commutation sequence when the circuit for determining the actual instantaneous position of the rotor detects that the rotor is actually in the desired rotor position. The step of determining the actual instantaneous position of the rotor is done by determining when the back emf of a floating coil crosses zero from a predetermined direction. In one embodiment, a mask is provided for performing the step of inhibiting the detection of a zero crossing of the back emf for a predetermined time after a change in commutation sequence.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENT

Figure 1:
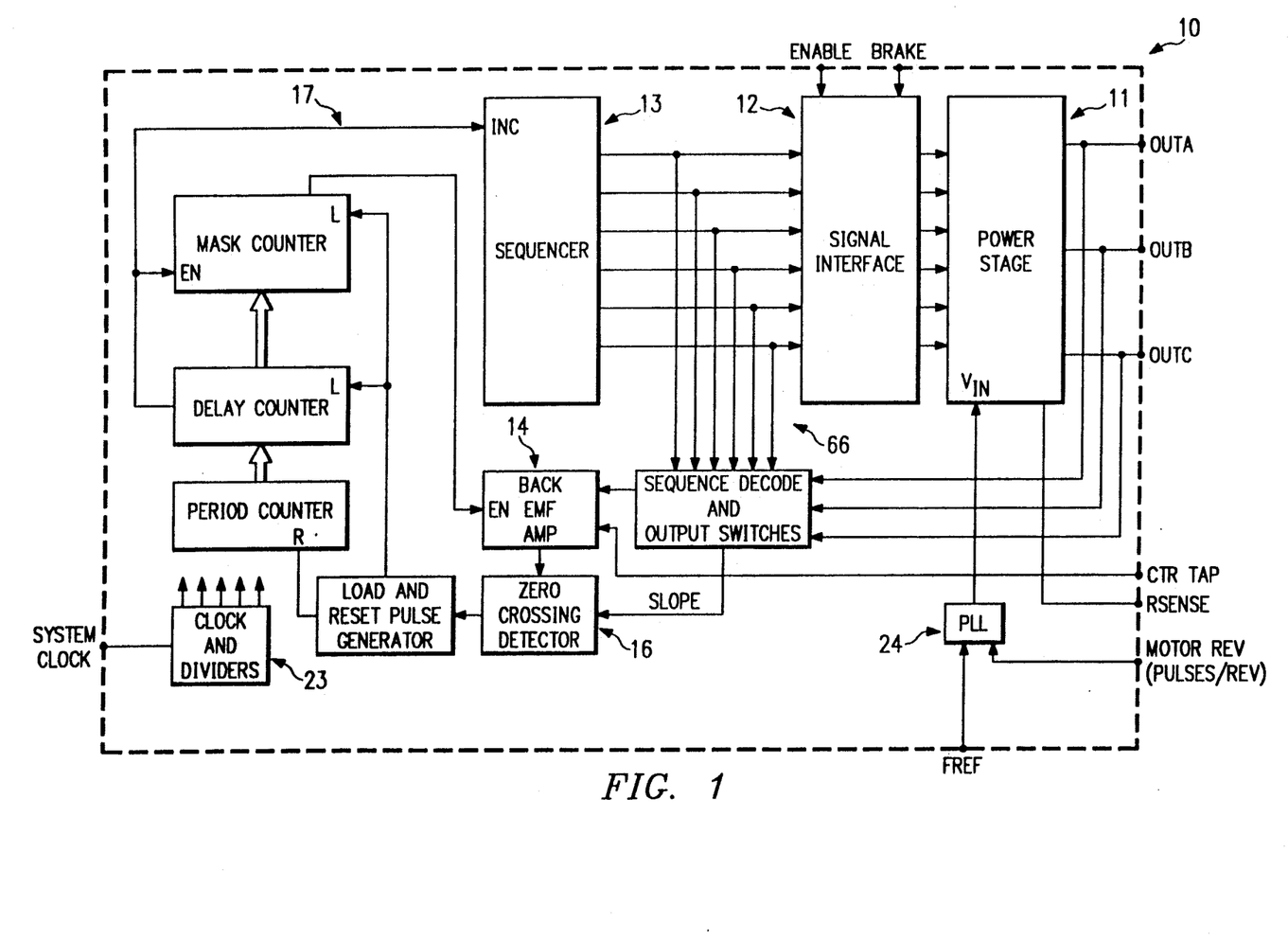
FIG. 1 is an electrical schematic block diagram of a motor driver system incorporating apparatus in accordance with a preferred embodiment of the invention.

A portion of an electrical schematic block diagram of a motor controller 10 in which the apparatus and method in accordance with a preferred embodiment of the invention may be incorporated is shown in FIG. 1. Although the motor controller can be constructed of discrete components, preferably, the motor controller 10 is integrated onto a single semiconductor chip adapted for connection to the stator coils of a three phase dc brushless spindle motor, for use, for example, to turn a magnetic or other disk in systems such as computer hard disk drives, cd-rom drives, floppy disk drives, and the like. Such 3 phase motor preferably has Y connected stator windings, although such Y configured winding connections are not essentially required. Thus, the windings can be connected to output terminals OUT A, OUT B, OUT C and CTR TAP, as below described in further detail. It should be noted that although a preferred embodiment of the invention is described with regard to a three phase motor, in particular, the principles of the invention can be equally advantageously applied to polyphase motors, in general.

The driving voltage is provided to the output terminals OUT A, OUT B, and OUT C by a power stage 11, which may be configured as described below with reference to FIG. 2. The power stage 11 is sequenced to provide sequential control output signals to the output terminals OUT A, OUT B, and OUT C by a sequencer circuit 13, described below with reference to FIG. 4, and a signal interface circuit 12 supplies the output signals from the sequencer circuit 13 to the power stage 11, as well as enabling other functions, such as brake and output enable functions. The sequencer 13 also provides drive and sequence signals on an "internal commutation bus" 66 to other circuits of the controller circuitry to control the various aspects of rotation of the motor driven by the circuit 10.

The output terminals OUT A, OUT B, and OUT C are also switchably connected to a back-emf sense amplifier 14, the details of which are described with reference to FIG. 5 below. The back-emf sense amplifier 14 in turn delivers signals to a zero crossing detector circuit 16, illustrated in FIG. 5 below, which provides input signals to a digital delay circuit 17, described in detail in FIG. 7 below. The output of the digital delay circuit 17 controls the operation of the sequencer 13, in a manner below described in detail. The motor controller circuitry 10 includes system clock circuitry 23, and phase lock loop (PLL) frequency/phase detector circuitry 24, and may include various other circuitry, not shown, such as circuitry to support pulse width modulation operation of the motor, "align and go" start up circuitry to facilitate start up of the motor from a stopped condition, port control logic and associated shift register circuitry to facilitate control of the motor controller circuitry by an external microprocessor (not shown), and so forth.

Figure 2:
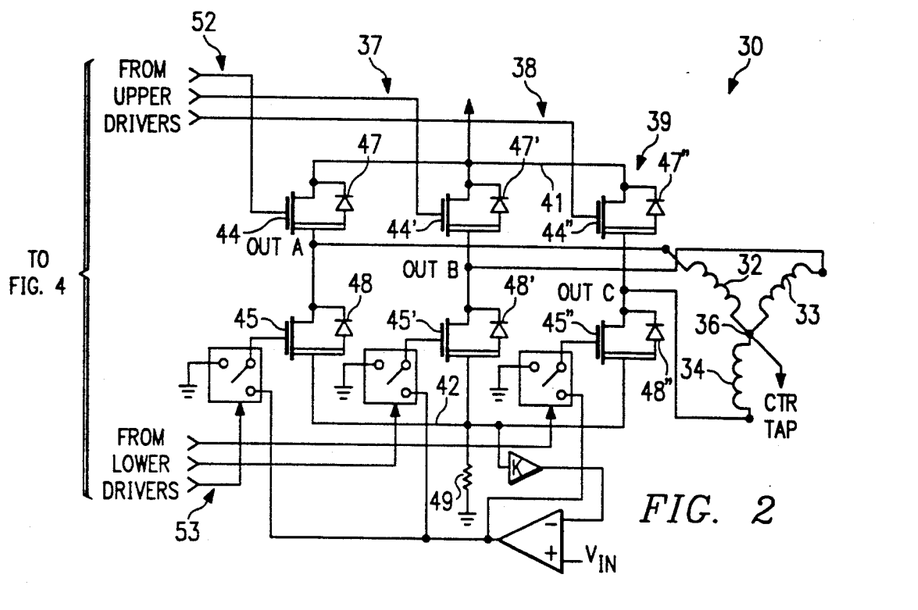
FIG. 2 is an electrical schematic diagram of the power stage used in the motor driver system of FIG. 1 for providing motor driving signals to the "Y" connected stator coils of the motor with which the driver system might be associated.

The power stage 11 of the motor control circuitry 10 is a conventional H-bridge 30, commonly referred to as a triple —½—H—bridge, as shown in FIG. 2. Also, the Y connected stator windings 32, 33, and 34 are shown in FIG. 2 connected to switchably receive the driving current delivered by the power stage 11 of the motor control circuitry 10. Three series current paths 37, 38, and 39 are provided between a supply voltage applied to a line 40, and a reference potential on line 42. Each current path includes, respectively, two switching transistors 44 and 45, 44' and 45', and 44" and 45". The transistors 44, 44', 44", 45, 45' and 45" can be of known power switch FETs, or other switch devices, as desired. The line 42 is connected to an external sense resistor 49 (externally connected to terminals R SENSE, as shown in FIG. 1), which in turn is connected to ground.

One end of each of the stator coils 32, 33, and 34 is connected together at a common center tap 36, the other ends being connected to respective nodes OUT A, OUT B, and OUT C between the respective pairs of switching transistors 44—45; 44'—45', and 44"—45". Each of the switching transistors 44, 45, 44,' 45', 44", and 45" has a flyback diode 47, 48; 47', 48'; and 47", 48" connected in parallel with its current path, as shown.

Figure 3:
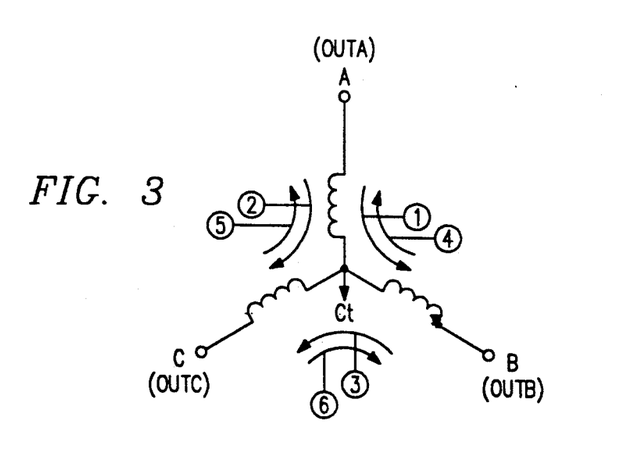
FIG. 3 is an electrical schematic diagram of a typical "Y" connected rotor coil arrangement, illustrating the current flow direction for 6 phases of a 3 phase motor.

In operation, during an energized phase, one node (for example, node out A) is driven high by one of the upper switches 44. One node (for example, node out B) is driven low by one of the lower switches 45,, and the other node (for example, node C) is left floating with both switches 44" and 45" off. This is commonly to as the "AB phase". The coils are then switched in a commutation sequence determined by the sequence circuit 13 in a manner such that in each commutation phase current always flows in two of the three coils, with the third coil floating, and that after switching current will continue to flow, and in the same direction, in one of the two coils in which current was flowing in the previous phase. More particularly, as shown in the diagram of FIG. 3, in a three phase motor, actually six operational phases exist. The current flows in each of these six phases as shown in the following Table A:

TABLE A

| Phase | Current Flows From: | To: | Floating Coil: |
|---|---|---|---|
| 1 | A | B | C |
| 2 | A | C | B |
| 3 | B | C | A |
| 4 | B | A | C |
| 5 | C | A | B |
| 6 | C | B | A |

Figure 4:
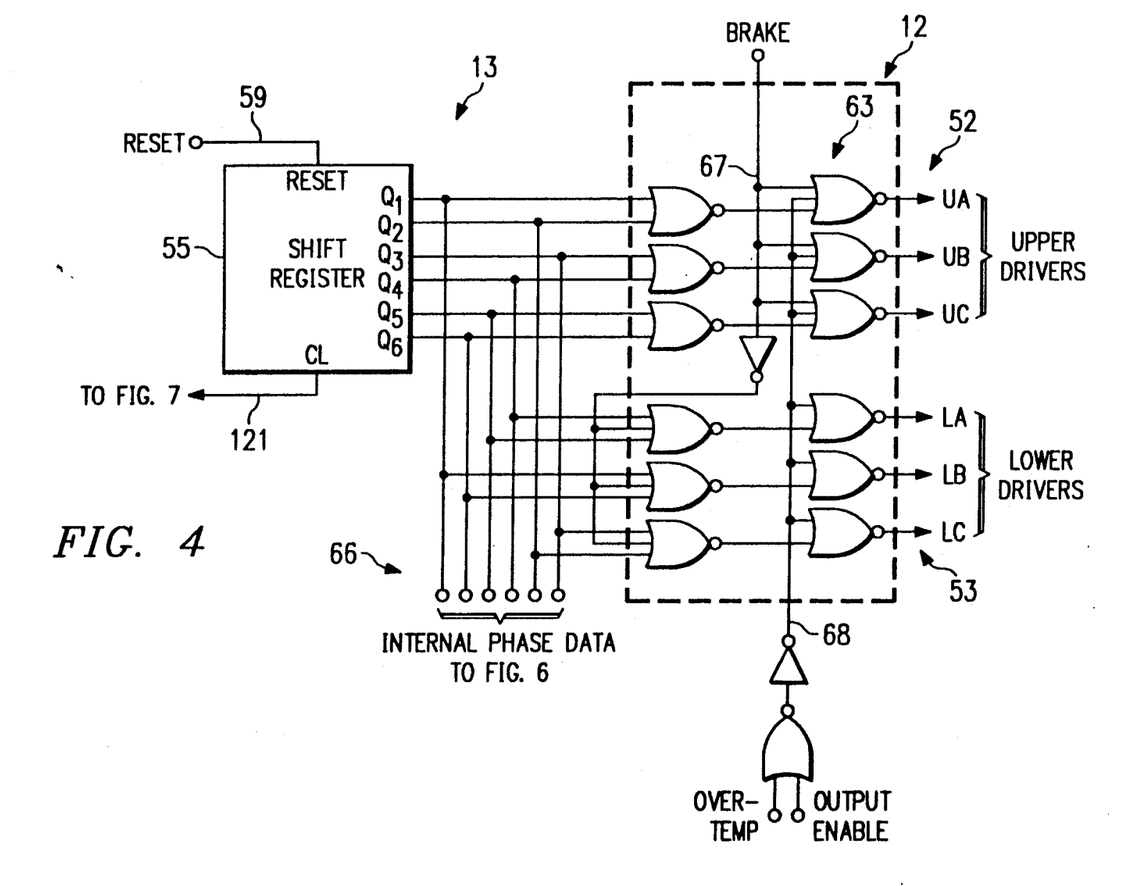
FIG. 4 is an electrical schematic diagram of a sequencer circuit used in the motor driver system of FIG. 1.

The switching of the driver transistors of the power stage 11 to effect the switching currents for each phase is accomplished by a sequencer circuit 13 and an associated interface circuit 12, as shown in FIG. 4. The sequencer circuit 13 provides signals through the interface circuit 12 to the upper driver outputs 52 and the lower driver outputs 53 to accomplish the switching sequence outlined above in Table A. The upper and lower driver outputs 52 and 53 are connected to the upper and lower driver input lines, shown in FIG. 2.

More specifically, a shift register 55 determines the specific upper and lower output lines which are activated at any particular instant. To accomplish the proper switching sequence, an appropriate sequence may be initially loaded into the shift register 55, and sequentially shifted through the various data positions of the shift register 55. For example, one data sequence in the embodiment shown which will produce the commutation sequence of Table A as it is clocked through the shift register 55 to sequentially appear at the outputs $Q_1$–$Q_6$ might be "110000". The shift register 55 is clocked by an increment signal introduced into the shift register 55 from a delay counter 112, described in detail below with respect to FIG. 7. Thus, the shift register 55 operates at any instant to present a high state on a selected two adjacent ones of the outputs $Q_1$–$Q_6$ to turn on the corresponding upper and lower transistors according to the sequence shown in Table A, with the remaining outputs turned off.

The other circuitry of the sequence circuit 13 includes a reset line 59 to initialize or reset the shift register 55, reestablishing the commutation sequence code above described in an initial starting position within the shift register 55. The outputs $Q_1$–$Q_6$ of the shift register 55 are also connected via lines of an internal commutation bus 66 to the zero voltage crossing logic control circuit of FIG. 6, described below. By virtue of the direct connection to the output lines of the shift register 55 of the sequence generator 13, the drivers of the power stage 11 can be tristated by appropriate signals applied to the signal interface circuit 12, without loss of the desired commutation signals. That is, if the commutation signals were to be derived for internal circuit use in detecting zero crossings, for example, at the output of the signal interface circuit, if the motor drivers were to be tristated, the commutation signals would be lost, and there would be no hope of reestablishing synchronization between the commutation signals and the motor without slowing the motor or employing complex resynchronization algorithms.

If desired, a brake signal developed elsewhere, perhaps externally to the motor control circuit 10, may be applied on line 67 to logic circuit 63 to prevent output to the motor on the upper and lower driver output lines 52 and 53 when such brake signal exists. The brake signal, which may be a software generated or external signal, is applied in the embodiment illustrated to turn on all the lower drivers, and to turn off all of the upper drivers. At the same time all of the coils 32, 33, and 34 may be shorted together so that the eddy currents generated by the magnetic field in the coils 32, 33, and 34 brakes the motor.

Also, signals which might be generated in response to an internal error or other abnormal condition, or to an external enable signal that would not require the motor to be braked, but which may require the removal of drive signals to the coils of the motor, may be applied on a line 68 to the final driver logic gates 63 as shown. Thus, in the presence of a signal on the line 68 (that is, a change to a low state from a normally high state), the drive is removed or inhibited from both the upper drivers 52 and the lower drivers 53 allowing the rotor of the motor to coast.

The commutation among the coils 32, 33, and 34, unlike previous commutation techniques, is performed in response to information indicating the specific unambiguous position of the rotor of the motor in conjunction with circuit information indicating the desired position of the rotor. More specifically, the commutation to apply the each successive sequence of Table A is determined in response to a corresponding coil reaching a particular rotational position and its correlation with sequencer information indicating where the motor should be at a particular time prior to when a commutation is to occur. The determination of the precise rotational location of the rotor is continuously being updated by monitoring the zero crossing voltage in each non-driven, or floating, coil. More particularly, as the coils 32, 33, and 34 are switched during the commutation sequence of the rotor, the voltage of the floating coil is monitored by the back emf amplifier circuit 14 shown in FIG. 5.

The back emf amplifier circuit 14 includes switches 81, 82, and 83 respectively connected to the motor driver outputs OUT A, OUT B, and OUT C, in the circuit of FIG. 2 to connect a selected one of the coils connected to the outputs OUT A, OUT B, or OUT C to the non-inverting input of a comparator 85. The particular one of the coils 32, 33, or 34 which is connected to the comparator 85 corresponds to whichever of the coils is expected to be floating (not necessarily the coil which is actually floating). Although the term "floating" is used herein to indicate the coil which is not in the instantaneous current path, the coils do not actually "float", but are connected to a tristate impedance when no drive current is being applied. The switches 81, 23, and 83 are operated by the circuit of FIG. 6, below described, to effect the switching of the coil expected to be floating, as just described.

The center tap connection 36 (see FIG. 2) of the rotor is connected to the inverting input of the comparator 85, so that when the voltage on the selected floating coil becomes larger than the center tap voltage, the comparator produces an output, representing the zero voltage crossing of the voltage on the selected floating coil. (The voltage which is applied to the input to the comparator 85 is the so-called "back emf" of the coil, the voltage generated in the selected floating coil as it moves through the magnetic field within the motor.) The comparator 85 is designed to have some hysteresis, because otherwise the occurrence of a voltage beyond the zero crossing voltage may not last a sufficiently long time to enable the output signal of the comparator 85 to be useful.

Figures 5, 5A:
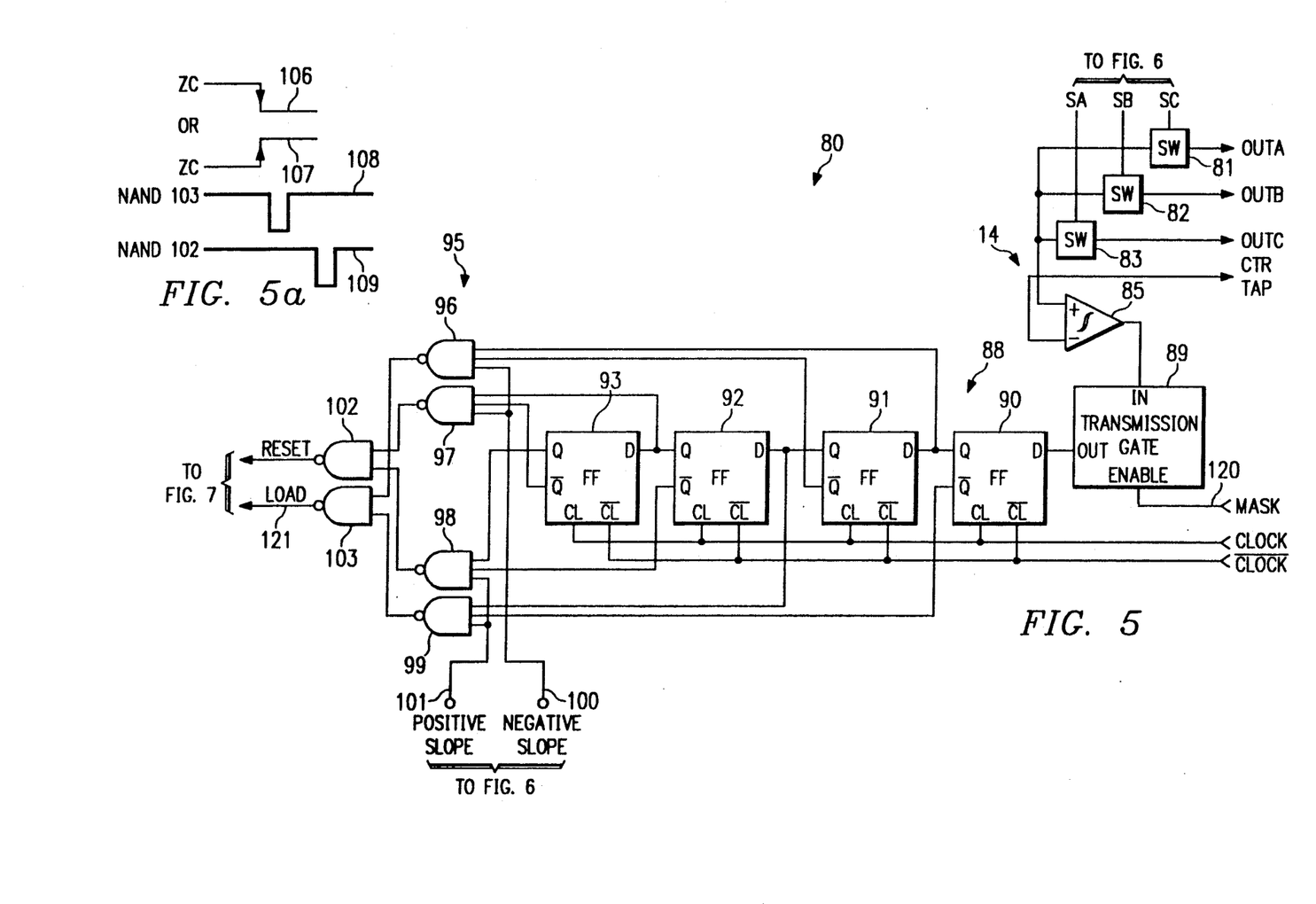
FIG. 5 is an electrical schematic diagram a back emf amplifier and zero crossing detector used in the motor driver system of FIG. 1.
FIG. 5a shows various voltage waveforms generated at the output the zero crossing detector of FIG. 5, illustrating their timed relationship to a detected rising or falling zero crossing.

With further reference to FIG. 5, the output from the comparator 85 is connected to a shift register 88 through a transmission gate 89. A mask signal generated in the sequencer circuit 13 (described below with respect to FIG. 4) is applied on a line 120 to an enable input of the transmission gate 89 so that the output from the comparator 85 is inhibited from being applied to the shift register 88 during the mask period following a phase commutation by the sequencer circuit 13. When, however, the output signal from the comparator 85 is enabled to pass the signal applied to the transmission gate 89, the signal is applied to the D input of the first of four D-type flip flops 90, 91, 92, and 93 comprising the shift register 88.

The various outputs of the flip flops 90, 91, 92, and 93 are connected to the output logic circuit 95, which includes NAND gates 96, 97, 98, and 99. Each of the flip flops 90, 91, 92, and 93 receive a clock input, for example from the system clock, and each produces an inverted Q(bar) and non-inverted Q output. The Q outputs of flip flops 90, 91, and 92 are applied to the D input of the respective next stage flip flops, and the Q output of the last stage flip flop 93 is connected to NAND gate 98 of the output logic circuit 95.

The Q outputs of the flip flops 90 and 92 are connected to inputs of the upper NAND gates 96 and 97, respectively, and the Q outputs of the flip flops 91 and 93 are connected to the inputs of the lower NAND gates 99 and 98, respectively. On the other hand, the Q(bar) outputs of flip flops 90 and 92 are connected to inputs of the lower NAND gates 99 and 98, respectively, and the Q(bar) outputs of flip flops 91 and 93 are connected to inputs of the upper NAND gates 96 and 97, respectively. Also, expected slope line 100 corresponding to an expected negative-to-positive going zero crossing slope is connected to inputs of NAND gates 96 and 97, and expected slope line 101 corresponding to an expected positive-to-negative going zero crossing slope is connected to inputs of NAND gates 98 and 99. The signals on lines 100 and 101 which indicate the direction of the expected zero crossing is generated from the phase information developed in the circuit of FIG. 6, which in turn, is derived from the outputs of the shift register 55 in the sequencer circuit of FIG. 4.

Finally, the outputs from the logic circuit 95 are connected to the output NAND gates 102 and 103, the outputs of which being produced in response to the detection of an actual zero crossing of a specified floating coil, the zero crossing having a transition in a specified, expected direction, ie, either a negative-to-positive going zero crossing transition or a positive-to-negative going zero crossing transition.

The connections to the output NAND gates 102 and 103 are established with the output of the upper NAND gate 96 and the lower NAND gate 99 connected to the inputs of the output NAND gate 103, and the output of the upper NAND gate 97 and the output of the lower NAND gate 98 connected to the inputs of the output NAND gate 102. The line 101 on which a signal would appear if a positive slope zero crossing is expected is connected to the inputs of the upper NAND gates 96 and 97, and the line 100 on which a signal would appear if a negative slope zero crossing is expected is connected to the inputs of the lower NAND gates 98 and 99. Thus, the upper NAND gates 96 and 97 are responsive the actual occurrence of an expected positive slope zero crossing and the lower NAND gates 98 and 99 are responsive to the actual occurrence of an expected negative slope zero crossing.

Because of the staged connections at the four stage shift register 88 for each of the positive and negative detection paths, the outputs from the output NAND gates 102 and 103 are two pulses, spaced in time, as shown in FIG. 5a by the curves 109 and 108, respectively, resulting from either a positive-to-negative zero crossing 106 or a negative-to-positive zero crossing 107. Thus, the pulse generated at the output of NAND gate 103 precedes the pulse generated at the output of NAND gate 102 by one clock cycle. The output of the NAND gate 103 is used to provide a "load" signal to the counters which measure the required mask and delay time after a phase commutation and the output of the NAND gate 102 is used to provide a "reset" signal to the period counter, as below described.

Figure 6:
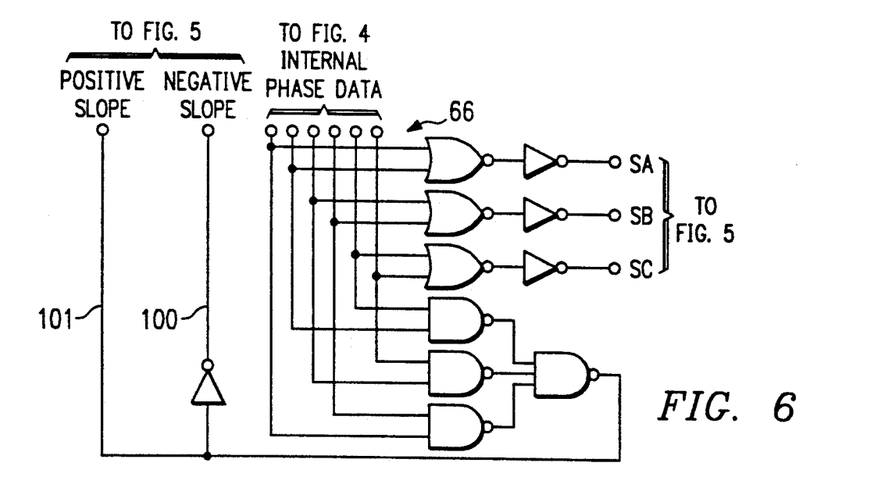
FIG. 6 is an electrical schematic diagram of a zero crossing logic switching circuit used to control the back emf amplifier connections in the circuit of FIG. 5.

The circuit for developing the switching signals for the switches 81, 82, and 83, as well as the negative and positive slope indicating signals on lines 100 and 101 is shown in FIG. 6, to which reference is now made. The circuit of FIG. 6 derives internal phase data on the lines of the internal commutation bus 66 from the output from the shift register 55 in FIG. 4. The lines 66 contain information respectively, from left to right indicating signals to upper and lower A, upper and lower B, and upper and lower C drive transistors (see FIG. 2). Thus, the output signal SA indicates that the coil at OUT A is expected to be floating, SB indicates the coil at OUT B is expected to be floating, and the output signal SC indicates the coil at OUT C is expected to be floating. The signals on lines 101 and 100 likewise, indicate whether the floating coil (that is, whichever may be instantaneously floating) is expected to experience a back emf zero crossing from the negative or positive direction.

Figure 7:
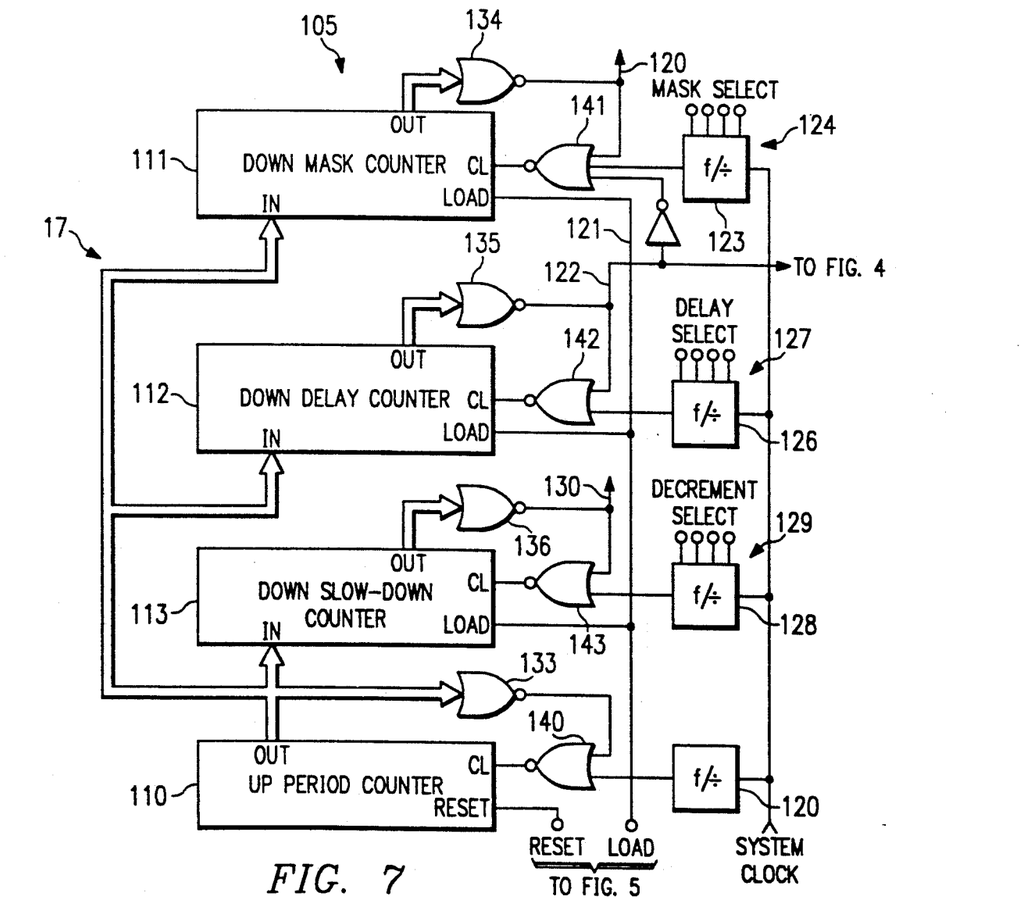
FIG. 7 is an electrical schematic diagram of a circuit for generating a sequencer noise mask and a coil switching transient noise mask, for use in the motor driver system of FIG. 1.

In order to assist the back emf amplifier 14 and logic circuit 95 to properly detect the zero crossing of the selected floating coil, the noise generated in the operation of various circuit elements, especially noise generated by the commutation of the driven coils, which tend to ring for some time after switching, and noise generated in the sequencer circuit is masked. To accomplish this masking function, as well as other circuit functions enabled by the method of operation of the circuit of the invention, the mask circuit 105 of FIG. 7 is provided.

The mask circuit 105 has an up counter 110, and three down counters 111, 112, and 113. The up counter 110 serves as a period counter to provide a digital count on its output corresponding to the time between actual zero crossings of the selected floating coils, detected by the zero crossing circuitry described above with reference to FIG. 5. The up counter 110 receives a clock signal input from a clock frequency divider 120, which divides the system clock frequency to a desired frequency, the particular frequency selected determining the resolution of the system. The up counter 110 is reset by the reset pulse produced by the NAND gate 102 in the circuit of FIG. 5, after a zero crossing has been detected. Accordingly, the up counter 110 starts to count after being reset upon detection of a first actual zero crossing, and continues the count until being again reset upon the detection of the next actual zero crossing.

The outputs of the up counter 110 are connected to the inputs of each of the down counters 111, 112, and 113, which serve various mask and control functions. The down counter 111 determines a mask time during which the noise of the sequencer circuit 13, shown in FIG. 4, as well as the noise produced by the coils 32, 33, and 34 in response to being commutated, is masked. The down counter 111 (hereafter referred to as the mask counter 111) produces an output on the line 120 when the desired mask count has been reached. The output signal on the line 120 is used to enable the transmission gate 89 in the zero crossing detector in FIG. 5, so that no zero crossing can be detected until the expiration of the mask period. The mask counter 111 receives a "LOAD" signal from line 121, the "LOAD" signal being produced by the output of the NAND gate 103, shown in FIG. 5, just prior to the occurrence of the RESET pulse upon the output of the NAND gate 102. When the load signal appears on the load input of the mask counter 111, the count then existing in the period counter 110 is immediately loaded into the mask counter 111.

The mask counter 111 also receives a clock signal from a frequency divider 123. If desired, a number of select terminals 124 may be provided enable the divisor of the frequency divider 123 to be controlled to allow the resolution of the mask count to be selected for a particular application in which the driver circuit 10 will be used.

Thus, in operation, when an actual zero crossing of a selected floating coil is detected by the circuitry of FIG. 5, the count which exists in the up counter 110 is loaded into the mask counter 111. The up counter reset to begin a new period count that will continue until the occurrence of the next zero crossing, at which time, the new count will be loaded into the mask counter 111, the up counter 110 reset, and the process repeated. It can therefore be seen that the actual mask time determined by the mask counter 111 will vary, depending upon the speed of rotation of the motor. (The percentage of the number of rotational degrees, however, will remain constant.)

In a similar fashion, the down counter 112 (hereafter referred to as the delay counter 112) serves to measure a time corresponding to a desired delay after the detection of a zero crossing before the coils are switched to the next commutation sequence. The delay counter 112 also receives a divided clock frequency from a frequency divider 126, the divisor of which may be selected by applying an appropriate signal to one of the select lines 127. The operation of the load and count functions are essentially the same as the operation of the mask counter 111 above described. However, it is noted that the time calculated by the delay counter 112 indicated by the output on line 122 may be substantially longer than the time calculated by the mask counter 111, the time being a function of the clock frequency, and/or if desired, by the number of bits of the period counter 110 which are loaded. The output signal on the line 122 is used to increment the sequencer 13 (see FIG. 2), as well as to enable the mask counter 111. By creating the delay between the zero crossing and incrementing to the next phase, the torque ripple can be optimized to take advantage of the inertia of the rotor.

Thus, the inverted output of the delay counter 112 on the line 122 is applied to the clock input of the mask counter 111 by a NAND gate 141 to which the clock pulses from the frequency divider 123 are also applied. The signal on the line 122, therefore, inhibits the application of the clock pulses to the mask counter 111 until after the completion of the delay count by the delay counter 112. The counts of the mask counter 111 and the delay counter 112 are therefore sequential, with the mask count of the mask counter 111 following the completion of the delay count of the delay counter 112 to mask switching and commutation noise, as described above, so that spurious zero crossings caused by switching noise will not be interpreted as an actual zero crossing of the selected floating coil.

Because the mask circuitry 105 of FIG. 7 operates on the actual, not expected, zero crossing signals of the floating rotor coils, many motor control functions which have been heretofore not possible to achieve are enabled. In addition, other motor control functions can easily be achieved. For example, additional down counters, such as the down counter 113 mentioned above can provide useful functions, such as a speed slow-down determination. The down counter 113 is referred to hereafter as the slow-down counter 113. The slow-down counter 113 operates in the same way as the mask counter 111 and delay counter 112, receiving a clock signal divided in frequency from the system clock frequency by a frequency divider 128. If desired, select input lines 129 may be provided to allow the frequency divisor to be selected for particular motor driver applications. By appropriately selecting the clock frequency applied to the slow-down counter 112 so that the down count will be longer than the time between actual zero crossings of the commutated floating coils, if the output signal on line 130 changes states, indicating that the slow-down counter 113 has completed its count, the signal indicates that the motor is slowing down. That is, the appearance of a signal on the output line 130 indicates that the period counted is greater than the previous period which was loaded into the counter indicating that the motor is slowing down.

For all of the counters 110, 111, 112, and 113, NAND gates 133, 134, 135, and 136 are provided to combine the outputs of the respective counters are combined, to provide an output which is combined with the respective clock signals by NAND gates 140, 141, 142, and 143. Thus, the count of any of the counters 110, 111, 112, or 113 is allowed only to reach its maximum up or down count, and its count is stopped so that the counter will not recycle and begin a new count.

Figure 8:
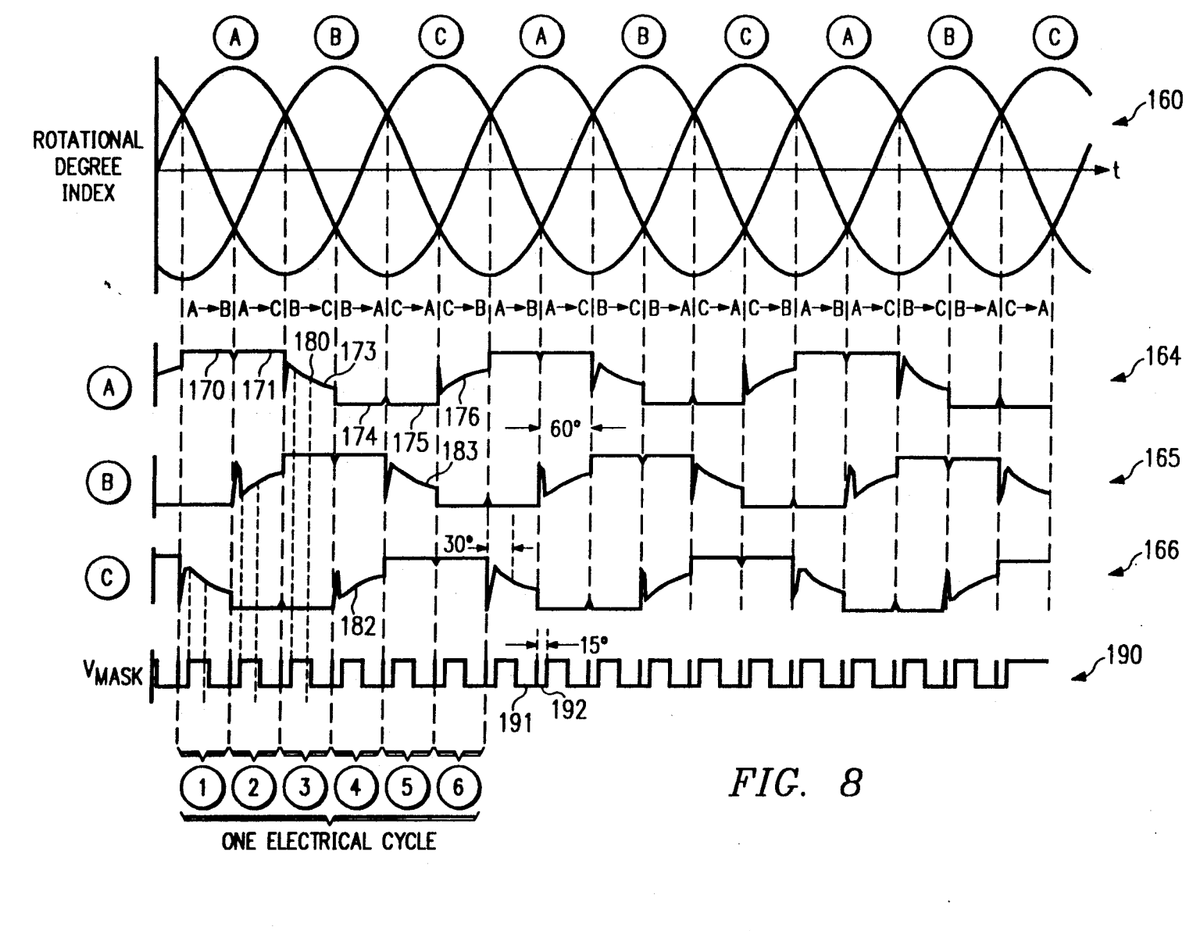
FIG. 8 are electrical waveforms showing the voltage signals at various points in the circuit of FIG. 1 with respect to several electrical cycles of the motor with which the driver circuit may be associated.

The overall operation of the circuit 10 will now be described, with reference to the waveforms which are developed in the various parts of the circuit, as shown in FIG. 8. The rotational degree index curves 160 for each coil are shown across the top of the waveforms for reference. Each sinusoidal waveform is labeled to correspond to the node to which each of the coils is connected: coil 32—A, coil 33—B, and coil 34—C. Beneath the rotational degree curves 160 is the corresponding commutation sequence which occurs at the specified rotational position.

The next three curves 164, 165, and 166 show the voltages of the respective driven coils A, B, and C. It can be seen that for one electrical cycle, indicated at the bottom of the curves of FIG. 8, each coil will have two sequences in which it has positive voltage, two sequences in which it has negative voltage, and two sequences during which it floats. For example, referring to the curves representing the voltage on coil A, the first two voltages 170 and 171 of sequences 1 and 2 during which current flows respectively from coil A to coil B, and from coil A to coil C, are positive. During the time coil A floats in sequence 3 the voltage 173 changes from positive to negative. The next two voltages 174 and 175 of sequences 4 and 5 during which current flows respectively from coil B to coil A, and from coil C to coil A, are negative. Finally, when coil A again floats during sequence 6, the voltage 176 changes from negative to positive. The other coils B and C have similar voltage curves, each displaced 120° from each other.

It can be seen that each coil floats twice during one electrical cycle, and has two zero crossings; however, one zero crossing has a negative slope, from positive to negative, and the other has a positive slope, from negative to positive. Thus, an ambiguity would exist if the rotor position were to be determined solely on the basis of a zero crossing without regard to the direction of the crossing. (This was one of the shortcomings of previous motor driver systems.) Thus, when the voltage, for example of coil A, transitions from positive to negative, shown by curve 173, a zero crossing 180 is detected by the zero crossing circuit 80, shown in FIG. 5. Moreover, the direction of the crossing also is detected by the slope detecting circuitry 95, also shown in FIG. 5. Once the zero crossing has been detected, and after the delay count of the delay counter 112 has been reached, the sequence is incremented, commutating the coils, and starting the mask period counter 111. When the mask period has expired, the zero crossing detector is then allowed to look for the zero crossing of the next floating coil; in this case of coil C, which will be transitioning from negative to positive, as can be seen from the curve 182 in FIG. 8. After its zero crossing is detected and commutation performed, the positive to negative zero crossing of floating coil B, shown by the curve 183 is sought, and so forth. Finally, the mask signal 190 which would be produced on the line 120 of the mask circuit of FIG. 7 is shown in the bottom curves of FIG. 8. The mask curve has two portions, for example 191 and 192, corresponding to the mask times of the delay counter 112 and the mask counter 111, respectively.

In summary, the commutation sequence is as follows: the sequencer circuit establishes a desired rotor phase, and the zero crossing detector detects its actual occurrence by finding the proper zero crossing. When the zero crossing is detected, first a delay is generated by the delay counter 112, after which the rotor coils are commutated, and a mask is generated by the mask counter 111. The identity of the next floating coil is determined by the phase information being generated from the output signals of the shift register 55, and the identified coil is connected to the back emf amplifier 85 by closing the proper switch 81, 82, or 83.

It can be seen that throughout the process, two key elements exist: 1) the anticipated zero crossing is first established and 2) only the actual zero crossing is detected which corresponds to that previously established. Until the actual zero crossing which is anticipated is detected, no commutation occurs. Thus, the sequencer 13 is always synchronized to the actual motor position, even if the drive signals to the motor are removed. For example, if the driver circuit 10 includes an overtemperature warning signal, a circuit can be provided to block the drive signals to the motor until the overtemperature condition is corrected. When the drive signals are blocked, of course the motor will slow down, but the sequencer will nevertheless remain synchronized to the motor rotation, so that when the overtemperature condition is corrected, drive can be immediately reapplied to bring the motor back up to operating speed without elaborate resynchronizing techniques. The same is true of other events which would otherwise cause the motor to lose synchronization with the sequencer, such as a bump to a disk driven by the motor, or the like.

Although the invention has been described and illustrated with a certain degree of particularity, it is understood that the present disclosure has been made by way of example only, and that numerous changes in the combination and arrangements of parts and features can be made by those skilled in the art without departing from the spirit and scope of the invention, as hereinafter claimed.

I claim:

1. A circuit for operating a polyphase dc motor having a plurality of driving coils, comprising:

circuitry for receiving the back emf of at least one coil at a time when said at least one coil is in a floating state prior to a desired commutation sequence;

circuitry for determining when the received back emf crosses zero from a predetermined direction to determine the actual position of the rotor of the motor;

a commutation sequence generator for generating sequence signals for controlling which of said plurality of driving coils to which motor drive signals are applied;

circuitry for determining a desired rotor position precedent to executing a desired commutation sequence, said circuitry for determining a desired rotor position being connected to directly receive said sequence signals from said commutation sequence generator;

and circuitry for executing said desired commutation sequence when the determined actual position of the rotor is the desired rotor position;

mask circuitry for inhibiting said circuitry for determining when the back emf crosses zero for a predetermined time after a change in said commutation sequence, said mask circuitry comprising:

an up counter and first and second down counters, a source of clock pulses connected to clock said up and down counters;

means to inhibit said clock pulses to said second down counter until said first down counter has reached a predetermined count; and means operative when said zero crossing detector detects a zero crossing to load a count from said up counter into said first and second down counters and then to reset said up counter;

whereby said first counter determines a switching time of said commutation sequence and said second counter determines a zero crossing mask period.

2. The circuit for operating a polyphase dc motor of claim 1 further comprising circuitry responsive to said first down counter reaching said predetermined count for advancing said circuitry for determining a desired rotor position precedent to executing a desired commutation sequence to advance to another desired rotor position precedent to executing another desired commutation sequence.

3. The circuit for operating a polyphase dc motor of claim 2 wherein said predetermined count is zero.

4. The circuit for operating a polyphase dc motor of claim 1 wherein said circuitry for executing said desired commutation sequence when said circuit for determining the actual position of the rotor detects that the rotor is actually in the desired rotor position is operative both in the presence and absence of actual drive signals to said rotor.

5. A circuit for operating a polyphase dc motor having a plurality of driving coils, comprising:

a driver for applying drive signals to said driving coils;

a drive signal supply circuit for supplying drive signals to said driver, said drive signal supply circuit including circuitry for selectively removing all drive signals from said driver;

an incrementable sequencer for generating commutative sequence signals for delivery to said drive signal supply circuit for application to said driving coils, said commutative sequence signals operative to cause each of said coils to selectively float without drive signals during a portion of said commutative sequence;

an internal commutation bus to receive the commutation sequence signals from said incrementable sequencer prior to said drive signal supply circuit;

a back emf amplifier for amplifying the back emf on said selected floating coil;

a zero crossing detector for determining when the back emf on said selected floating coil crosses zero;

a synchronizing circuit connected to receive said sequence signals from said internal commutation bus for determining which of said plurality of coils should be floating and to connect said determined coil to said back emf amplifier;

circuitry responsive to said zero crossing detector to increment said sequencer in said commutative sequence;

and mask circuitry to inhibit said detection circuitry from determining when the back emf on said floating coil crosses zero for a predetermined mask time after said sequencer has been incremented.

6. The circuit of claim 5 wherein said mask circuitry comprises circuitry to generate a delay period after said zero crossing detector determines a zero crossing for timing a commutation sequence change, and circuitry for generating a mask period after commutation.

7. The circuit of claim 6 wherein said circuitry to increment said sequencer is responsive to said circuitry for generating said delay period.

8. The circuit of claim 5 wherein said zero crossing detector further comprises circuitry to detect whether said zero crossing occurs with negative or positive slope.

9. The circuit of claim 7 wherein said mask circuitry comprises:

an up counter and first and second down counters, a source of clock pulses connected to clock said up and down counters;

means to inhibit said clock pulses to said second down counter until said first down counter has reached a predetermined count;

means operative when said zero crossing detector detects a zero crossing to load a count from said up counter into said first and second down counters and then to reset said up counter;

whereby said first counter determines said delay period and said second counter determines said mask period.

10. The circuit of claim 7 wherein said circuitry responsive to said zero crossing detector to increment said sequencer in said commutative sequence is operated in response to said first down counter reaching a predetermined count.

11. The circuit of claim 10 wherein said predetermined count is zero.

12. The circuit of claim 5 wherein sad circuit for operating a polyphase dc motor is a circuit for operating a brushless sensorless 3 phase dc motor.

13. A method for operating a polyphase dc motor having a plurality of driving coils, comprising:

determining when the back emf of at least one coil at a time when said at least one coil is in a floating state prior to said desired commutation sequence crosses zero from a predetermined direction to determine the actual position of the rotor of the motor;

determining a desired rotor position precedent to executing a desired commutation sequence, based upon sequence signals at an output of a sequence generating circuit;

executing said desired commutation sequence when said circuit for determining the actual instantaneous position of the rotor detects that the rotor is actually in the desired rotor position;

inhibiting the detection of a zero crossing of said back emf for a predetermined time after said back crosses zero;

providing an up counter and first and second down counters, providing a source of clock pulses connected to clock said up and down counters;

inhibiting said clock pulses to said second down counter until said first down counter has reached a predetermined count;

loading a count from said up counter into said first and second down counters when said zero crossing detector detects a zero crossing and then resetting said up counter.

14. The method of claim 13 further comprising providing circuitry responsive to said first down counter reaching sad predetermined count for advancing said circuitry for determining a desired rotor position precedent to executing a desired commutation sequence to advance to another desired rotor position precedent to executing another desired commutation sequence.

15. A circuit for operating a polyphase dc motor having a plurality of driving coils, comprising:
- a sequence generator for generating sequence signals at an output, said sequence signals for driving said driving coils in a predetermined commutation sequence;
- a drive signal supply circuit for supplying drive signals for application to the driving coil;
- an internal commutation bus to receive the commutation sequence signals from said sequencer prior to said drive signal supply circuit;
- circuitry for determining the position of the rotor of the motor;
- a back emf amplifier switchably connected in accordance with said sequence signals at said output of said sequence generator to individual coils when said individual coils are in a floating state;
- zero crossing circuitry for determining when the output of said back emf amplifier crosses zero in response to said sequence signals;
- mask circuitry for inhibiting said zero crossing circuitry for a predetermined time after a change of commutation sequence, said mask circuitry comprising:
  - an up counter and a down counter;
  - a source of clock pulses connected to clock said up and down counters;
  - an output from said down counter being connected to inhibit said zero crossing circuitry until a count in said down counter is reached; and
- means for loading a count from said up counter into said down counter and then for resetting sad up counter when said zero crossing circuitry detects a zero crossing to vary the predetermined time of said mask circuitry in dependence upon the speed of the rotor.

* * * * *